Sept. 6, 1938.   C. O. HESLEP   2,129,580
DIFFERENTIAL BEARING FOR TRUCKS
Filed Aug. 4, 1937   2 Sheets-Sheet 1

C. O. Heslep
INVENTOR
BY Victor J. Evans & Co.
ATTORNEYS

Sept. 6, 1938.  C. O. HESLEP  2,129,580
DIFFERENTIAL BEARING FOR TRUCKS
Filed Aug. 4, 1937   2 Sheets-Sheet 2
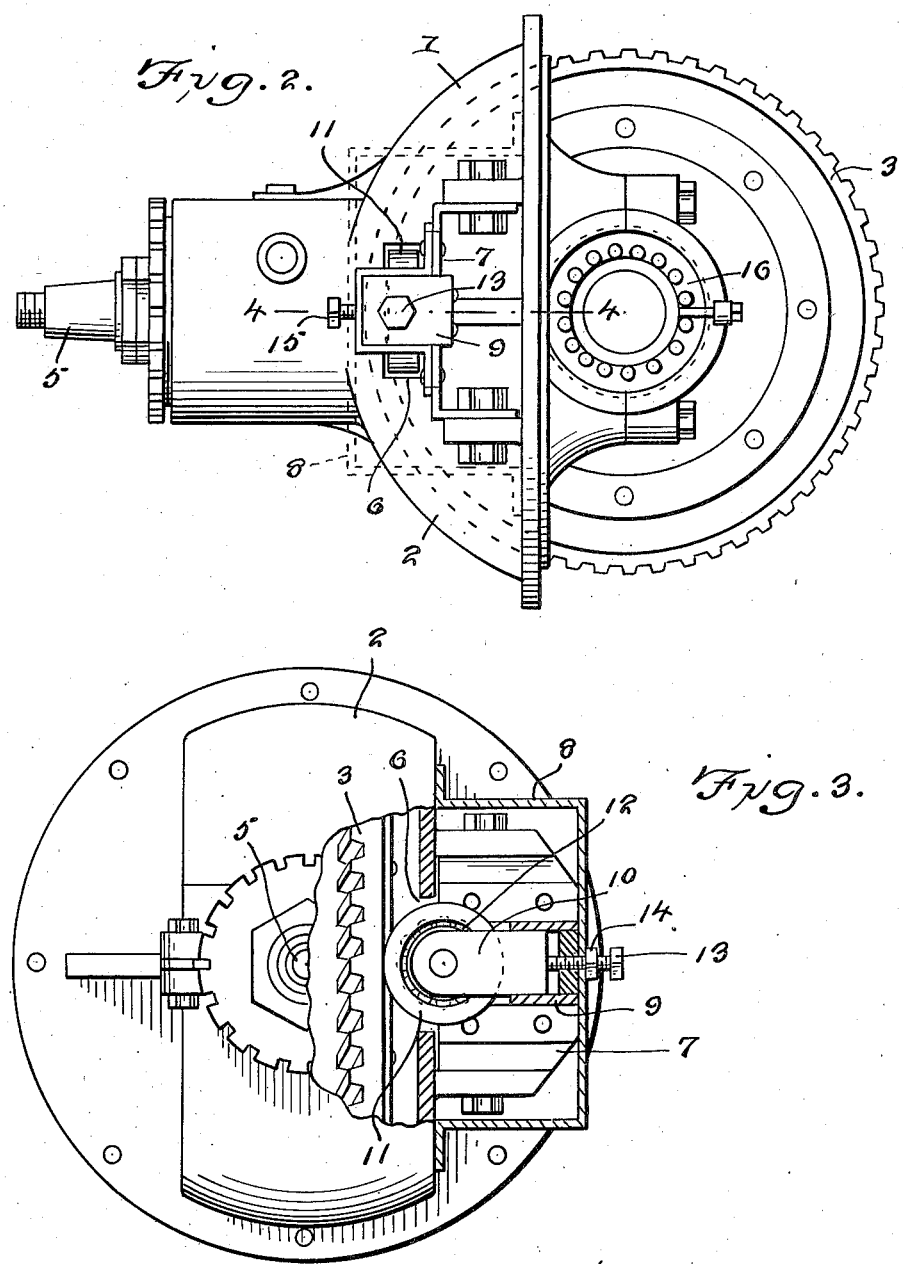
C. O. Heslep
INVENTOR
BY Victor J. Evans & Co.
ATTORNEYS Patented Sept. 6, 1938

2,129,580

UNITED STATES PATENT OFFICE 2,129,580

DIFFERENTIAL BEARING FOR TRUCKS

Clarence O. Heslep, Peterstown, W. Va.

Application August 4, 1937, Serial No. 157,438

1 Claim. (Cl. 74—311)

This invention relates to differentials and has for the primary object the provision of an adjustable means for supporting the ring gear of a differential opposite the drive pinion which will prevent lateral movement of the ring gear away from the drive pinion and thereby eliminate damage to the ring gear as well as to the drive pinion caused by the ring gear shifting away from said pinion when under severe loads, also the invention includes thrust means in close proximity to the ring gear, which with said adjustable means maintains the ring gear in proper position with respect to the drive pinion.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view, partly in section, illustrating a differential constructed in accordance with my invention.

Figure 2 is a side elevation illustrating the same.

Figure 3 is an end elevation, partly in section, illustrating the device.

Figure 1:
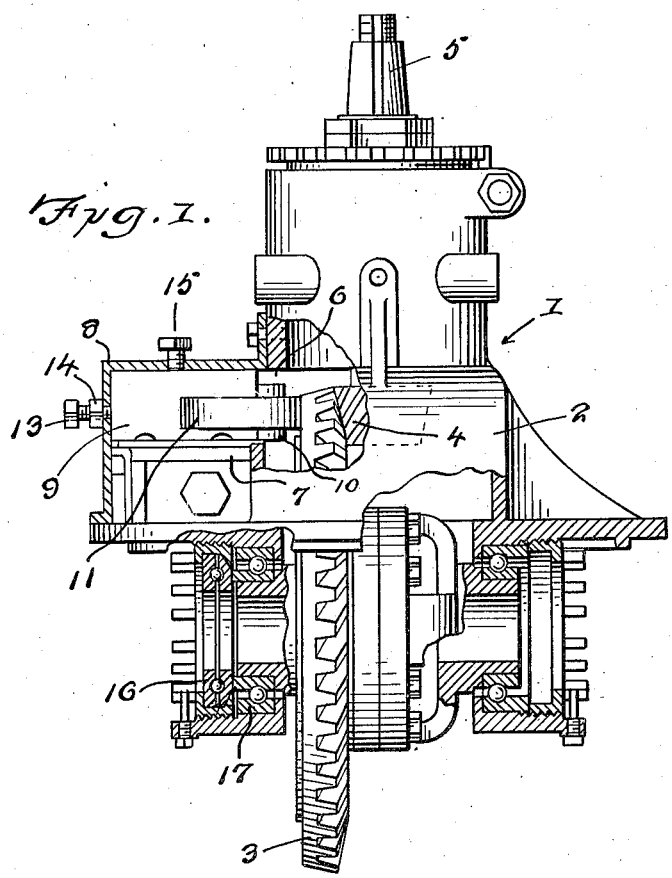
Figure 4:
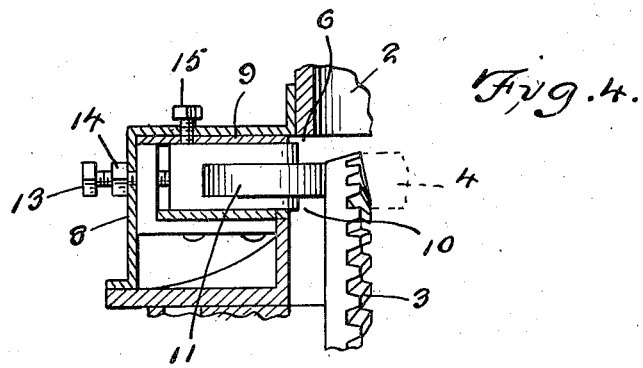
Figure 4 is a sectional view taken on the line 4—4 of Figure 2.

Referring in detail to the drawings, the numeral 1 indicates in entirety a conventional type of differential including a differential housing 2, ring gear 3 and drive pinion 4, the shaft of which is indicated by the character 5. It has been the customary practice to employ a set bolt or similar device to contact the ring gear opposite to where the ring gear meshes with the drive pinion 4 to prevent lateral displacement of the ring gear away from the drive pinion. The present arrangement is not capable of withstanding severe strains or loads and soon wears and thereby permits lateral shifting of the ring gear permitting teeth thereof to jam with teeth of the ring gear, consequently bringing about damage to both teeth of the ring gear and the drive pinion. To overcome these disadvantages my invention is adapted to the differential 1 by providing in the differential housing 2 an opening 6 over which is positioned a mounting 7 and enclosing said mounting is an auxiliary housing 8 suitably secured on the housing 2 for the purpose of closing the opening 6. Slidable in the mounting 7 is a block 9 including a forked portion 10 extending into the differential housing and terminating adjacent the ring gear 3. Journaled on the forked portion 10 is a roller 11 equipped with anti-friction bearings 12. The block 9 is adjusted in the mounting 7 until the roller contacts the ring gear opposite the pinion 4 with sufficient force to maintain the ring gear in proper mesh with the pinion and will prevent the ring gear from shifting laterally away from the drive pinion when under severe loads. Carried by the auxiliary housing 8 is a set bolt 13 for adjusting the block 9 towards the ring gear and is provided with a lock nut 14. A set bolt 15 extends through the auxiliary housing and has threaded engagement with the mounting 7 and is adapted to be turned against the block 9 for retaining the latter in any of its adjusted positions.

To further prevent lateral shifting of the ring gear away from the drive pinion a thrust bearing 16 in combination with a load carrying bearing 17 is mounted in the differential housing 2 and engages with the hub of the ring gear. It is to be understood that one of the axles of the differential extends through the thrust and load carrying bearing into the ring gear for connection therewith. As wear may occur on the roller 11 the block 9 may be adjusted towards the ring gear to compensate for wear and thereby maintain the ring gear in proper relation with the drive pinion.

The roller 11 being equipped with antifriction bearings 12 and said roller being in direct contact with the ring gear will reduce friction to a minimum.

What is claimed is:

In combination with a differential including a differential housing and a ring gear and drive pinion located therein, a mounting carried by the housing, a block adjustable in said mounting and including a roller engageable with the ring gear opposite the drive pinion to prevent shifting of the ring gear laterally away from the drive pinion, and including anti-friction means to permit the roller to rotate freely relative to said block, means for adjusting the block towards the ring gear, a locking means for said block, and an auxiliary housing covering said mounting and secured to the differential housing.

CLARENCE O. HESLEP.